US012260240B2

(12) United States Patent
Bregman et al.

(10) Patent No.: US 12,260,240 B2
(45) Date of Patent: Mar. 25, 2025

(54) CONTAINER IMAGE FILE OPTIMIZATION

(71) Applicant: Red Hat, Inc., Raleigh, NC (US)

(72) Inventors: Arie Bregman, Gan Yavne (IL); Steve Mattar, Herzliya (IL)

(73) Assignee: Red Hat, Inc., Raleigh, NC (US)

( * ) Notice: Subject to any disclaimer, the term of this patent is extended or adjusted under 35 U.S.C. 154(b) by 609 days.

(21) Appl. No.: 17/475,505

(22) Filed: Sep. 15, 2021

(65) Prior Publication Data

US 2023/0080518 A1 Mar. 16, 2023

(51) Int. Cl.
*G06F 9/455* (2018.01)
*G06F 8/61* (2018.01)

(52) U.S. Cl.
CPC ............ *G06F 9/45558* (2013.01); *G06F 8/63* (2013.01); *G06F 2009/45562* (2013.01)

(58) Field of Classification Search
CPC ................................ G06F 9/45558; G06F 8/63
See application file for complete search history.

(56) References Cited

U.S. PATENT DOCUMENTS

| | | | |
|---|---|---|---|
| 9,684,561 B1* | 6/2017 | Yan ..................... | G06F 11/1415 |
| 10,002,247 B2 | 6/2018 | Suarez et al. | |
| 10,511,481 B1* | 12/2019 | Castellanos ......... | H04L 41/0883 |
| 10,528,337 B1* | 1/2020 | Varadharajan Kannan ................. | G06F 8/71 |
| 10,810,003 B2 | 10/2020 | Gainsborough et al. | |
| 10,838,702 B2 | 11/2020 | Li et al. | |
| 11,029,975 B2 | 6/2021 | Prasad et al. | |
| 11,238,009 B1* | 2/2022 | Dhakras ............... | G06F 11/1446 |
| 2017/0177877 A1* | 6/2017 | Suarez ................ | G06F 21/6218 |
| 2018/0349150 A1* | 12/2018 | Wong .................... | G06F 9/4493 |
| 2019/0114164 A1* | 4/2019 | Wong ...................... | G06F 8/658 |
| 2019/0273655 A1* | 9/2019 | Jones .................. | H04L 41/0886 |
| 2020/0065118 A1 | 2/2020 | Nag et al. | |
| 2020/0142680 A1* | 5/2020 | Varadharajan Kannan ................. | G06F 8/63 |
| 2020/0241867 A1* | 7/2020 | Gainsborough .......... | G06F 8/63 |
| 2020/0409680 A1* | 12/2020 | Vaddi ........................ | G06F 8/71 |
| 2021/0064412 A1* | 3/2021 | Yamaguchi ......... | G06F 9/45558 |
| 2021/0103450 A1* | 4/2021 | Prasad ................ | G06F 9/45558 |
| 2022/0043916 A1* | 2/2022 | Wolfson .................. | G06F 21/53 |
| 2022/0283794 A1* | 9/2022 | Wolfson ................ | H04L 9/0822 |

OTHER PUBLICATIONS

The extended European search report for EP Application No. 21209239.9-1203, issued Apr. 28, 2022, 10 pages.

(Continued)

*Primary Examiner* — Benjamin C Wu
(74) *Attorney, Agent, or Firm* — Womble Bond Dickinson (US) LLP

(57) ABSTRACT

A method includes analyzing, by a processing device, a set of container images. Each container image of the set of container images is built by executing a container image file having a plurality of lines arranged in accordance with an execution order. The method further includes assigning, by the processing device, a frequency of change to each line of the plurality lines in view of the set of container images, and modifying, by the processing device, the execution order to obtain a set of modified execution orders by reordering execution of at least a subset of the plurality of lines in view of their respective frequencies of change.

20 Claims, 6 Drawing Sheets

(56) References Cited

OTHER PUBLICATIONS

Rivera, Angel, "Tips for optimizing Docker builds", https://circleci.com/blog/tips-for-optimizing-docker-builds/, Oct. 30, 2020, 10 pages.
Sciforce, "Strategies of docker images optimization", https://medium.com/sciforce/strategies-of-docker-images-optimization-2ca9cc5719b6, Jan. 3, 2020, 13 pages.

* cited by examiner

CONTAINER IMAGE FILE OPTIMIZATION

TECHNICAL FIELD

The present disclosure is generally related to computer systems, and more particularly, to container image file optimization.

BACKGROUND

Platform-as-a-Service (PaaS) system offerings can include software and/or hardware facilities for facilitating the execution of web applications in a cloud computing environment (the "cloud"). Cloud computing is a computing paradigm in which a user engages a "cloud provider" to execute a program on computer hardware owned and/or controlled by the cloud provider. A cloud provider can make virtual machines (VMs) and/or containers hosted on its computer hardware available to customers for this purpose. A container is a "lightweight" execution environment having relaxed isolation properties (as compared to VMs) for sharing an Operating System (OS) among applications. Similar to a VM, a container can have its own filesystem, share of CPU, memory, process space, etc. A container for an application can be packaged, together with libraries and dependencies and decoupled from the underlying infrastructure, making the container portable (e.g., portable across clouds and OS distributions). The cloud provider can provide an interface that a user can use to requisition VMs and/or containers and associated resources such as security policies, processors, storage, and network services, etc., as well as an interface to install and execute the user's applications and files. PaaS system offerings can facilitate deployment of web applications without the cost and complexity of buying and managing the underlying hardware and software and provisioning hosting capabilities, providing the facilities to support the complete life cycle of building and delivering web applications and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
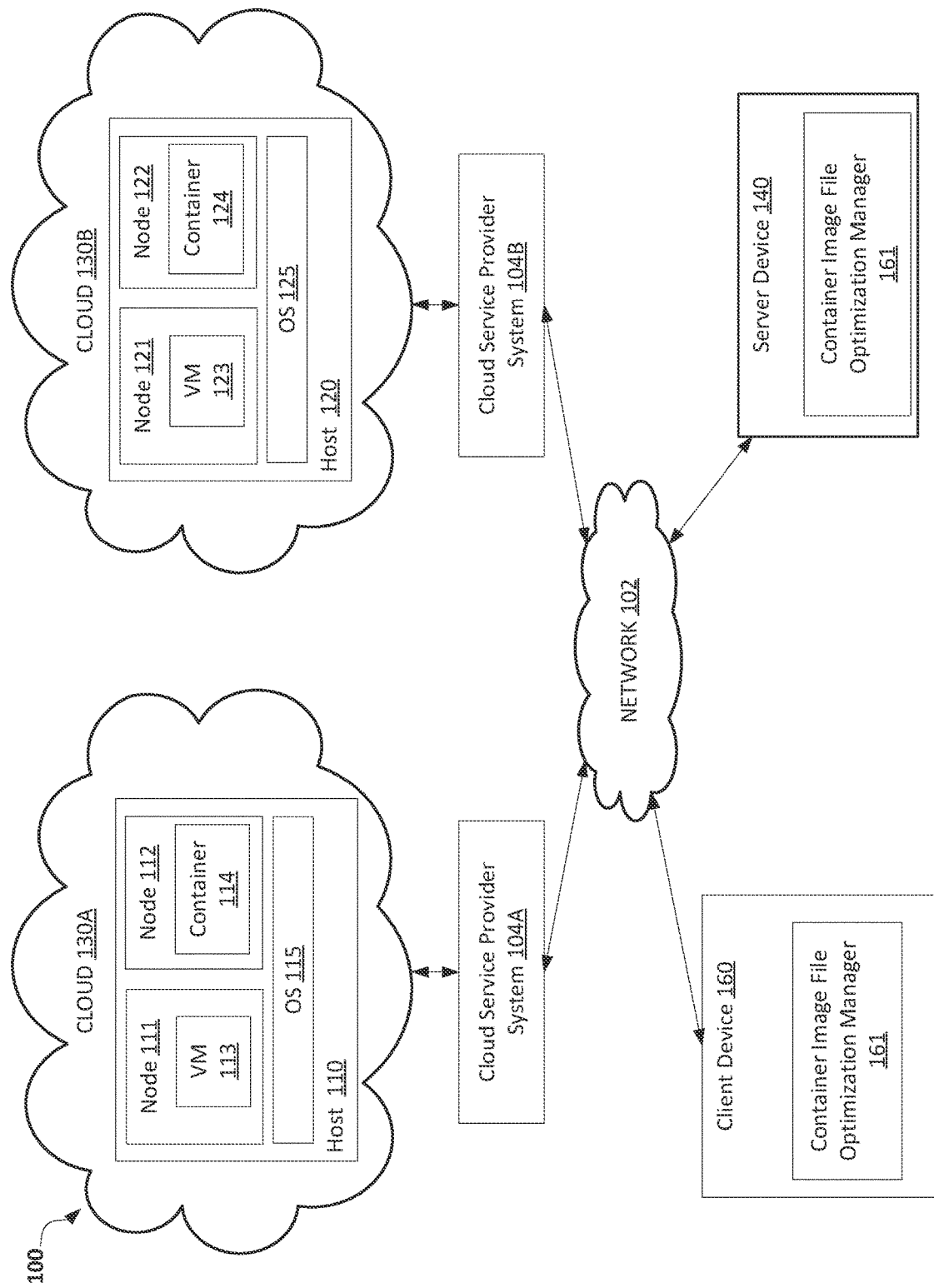
FIG. 1 depicts a high-level component diagram of an example computer system architecture, in accordance with one or more aspects of the present disclosure.

Described herein are methods and systems for container image build optimization. A container image file is a lightweight, standalone, executable package of software that includes components needed to execute an application. Examples of such features include, but are not limited to, code, runtime, system tools, system libraries and settings. A container image file can include a number of lines of code that are executed by to build a container image. Upon creation of the container image from the container image file, execution of the application that has been created to run as part of the container can begin. Once the tasks of the application are complete, the container can automatically terminate.

In some instances, a caching mechanism can be used to speed up container image builds that utilize the same container image file. For example, after a container image is built from a container image file for a first time (first container image), data obtained during the execution of the container file can be stored within a cache. If a second container image to be built from the same container image file (second container) does not have any changes with respect to the first container image, then the existing cached data can be used to build the second container image and thus improve computational efficiency during the container image build process. For example, if a line of the container image file installs a package during the first container image build, the package can be stored in cache. To build the second container image, instead of executing the line of the container image file to install the package, the package can be retrieved from cache.

However, the container image file may not be properly optimized to take full advantage of the caching mechanism. For example, each time data to be accessed upon execution of a line of the container image file changes between consecutive container image builds (e.g., if the directory from which an application is copied to build the container image changes), the line has to be re-executed as it cannot rely on the corresponding cached data from the previous execution as the cached data may be obsolete due to the change. In addition, all subsequent lines of the container image file after a re-executed initial line may similarly have to be re-executed, as the re-execution of the initial line can change how the subsequent lines of the container image file may be executed. It can be difficult to determine how to optimize a container image file to take full advantage of the caching mechanism, as knowledge of the caching mechanism may be required, as well as awareness of which lines in the container image file are more prone to change between container image builds.

Aspects of the present disclosure address the above noted and other deficiencies by implementing container image file optimization. The embodiments described herein can be implemented by a container engine, or by a standalone tool operatively coupled with the container engine. To optimize container image file optimization, the systems and methods described herein can analyze a set of container images built by a number of executions of a same container image file identify if any modifications should be made to the execution order of the container image file for improved optimization in view of a container image file caching mechanism. For example, the systems and methods described herein can track container image builds that use a same container image file, and analyze the container images to identify a change frequency of each line from build to build. The analysis can include identifying the line positions for each line within the container image file, and determining the change frequency for each line position. Based on the analysis, a modification to the execution order of at least one pair of lines can be proposed to improve container image build efficiency by reducing the number of repeat executions. More specifically, to reduce the likelihood that multiple repeat executions will be required on a build to build basis, the execution order can be set by arranging the line positions in ascending order of change frequency, where the first line to be executed during a container image build has the lowest change frequency and the last line to be executed during the container image build has the highest change frequency.

For example, assume that a first line of a container image file is determined to have a 60% change frequency between container image builds, and a second line of the container image that is positioned to be executed after the first line is determined to have a 30% change frequency between container image builds. Since a line change between builds results in re-execution of the line and any subsequent lines (as the line and any subsequent lines will be unable to rely on cached data from a previous execution of the container image file), it is more likely that, in the current execution order, the first line and at least the second line will require re-execution due to the higher change frequency of the first line (as compared to a modified execution order in which at least the first and second lines are swapped). Therefore, the position of the first and second lines may be swapped to improve container image build efficiency for the container image file.

Even if a modification to the container image file is proposed, it does not necessarily mean that the proposed modification is acceptable since the proposed modification may interfere with the execution logic of the container image file. For example, a line for executing an application during the container image file build cannot be executed prior to a line for installing packages during the container image file build. To address this, the embodiments described herein can initiate a process to generate a proposed modification to a container image file, and accept or reject the proposed modification to the container image file before committing the proposed modification for future container image builds. For example, an indication of an acceptability of the proposed modification to the container image file can be received from a user device via a user interface. A record that indicates whether a current proposed modification to a container image file was accepted or rejected can be generated and maintained in a record store, which can be used to automate the acceptance and/or rejection process with respect to a future proposed modification to the container image file similar to the current proposed modification to the container image file.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as Red Hat® OpenShift®. The PaaS system provides resources and services (e.g., micro-services) for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes one or more cloud-computing environment 130A, 130B (also referred to herein as a cloud(s)) that includes nodes 111, 112, 121, 122 to execute applications and/or processes associated with the applications. A "node" providing computing functionality may provide the execution environment for an application of the PaaS system. In some implementations, the "node" may include a virtual machine (VMs 113, 123) that is hosted on a physical machine, such as host 110, 120 implemented as part of the clouds 130A, 130B. For example, nodes 111 and 112 are hosted on physical machine of host 110 in cloud 130A provided by cloud provider 104A. Similarly, nodes 121 and 122 are hosted on physical machine of host 120 in cloud 130B provided by cloud provider 104B. In some implementations, nodes 111, 112, 121, and 122 may additionally or alternatively include a group of VMs, a container (e.g., container 114, 124), or a group of containers to execute functionality of the PaaS applications. When nodes 111, 112, 121, 122 are implemented as VMs, they may be executed by operating systems (OSs) 115, 125 on each host machine 110, 120. It should be noted, that while two cloud providers systems have been depicted in FIG. 1, in some implementations more or fewer cloud service provider systems 104 (and corresponding clouds 130) may be present.

In some implementations, the host machines 110, 120 can be located in data centers. Users can interact with applications executing on the cloud-based nodes 111, 112, 121, 122 using client computer systems (not pictured), via corresponding client software (not pictured). Client software may include an application such as a web browser. In other implementations, the applications may be hosted directly on hosts 110, 120 without the use of VMs (e.g., a "bare metal" implementation), and in such an implementation, the hosts themselves are referred to as "nodes".

In various implementations, developers, owners, and/or system administrators of the applications may maintain applications executing in clouds 130A, 130B by providing software development services, system administration services, or other related types of configuration services for associated nodes in clouds 130A, 130B. This can be accomplished by accessing clouds 130A, 130B using an application programmer interface (API) within the applicable cloud service provider system 104A, 104B. In some implementations, a developer, owner, or system administrator may access the cloud service provider system 104A, 104B from a client device (e.g., client device 160) that includes dedicated software to interact with various cloud components. Additionally, or alternatively, the cloud service provider system 104A, 104B may be accessed using a web-based or cloud-based application that executes on a separate computing device (e.g., server device 140) that communicates with client device 160 via network 102.

Client device 160 is connected to hosts 110 in cloud 130A and host 120 in cloud 130B and the cloud service provider systems 104A, 104B via a network 102, which may be a private network (e.g., a local area network (LAN), a wide area network (WAN), intranet, or other similar private networks) or a public network (e.g., the Internet). Each client 160 may be a mobile device, a PDA, a laptop, a desktop computer, a tablet computing device, a server device, or any other computing device. Each host 110, 120 may be a server computer system, a desktop computer or any other computing device. The cloud service provider systems 104A, 104B may include one or more machines such as server computers, desktop computers, etc. Similarly, server device 140 may include one or more machines such as server computers, desktop computers, etc.

In some implementations, the client device 160 may include a container image file optimization manager 161. For example, the container image file optimization manager 161 may be an application that executes entirely on client device 160. In other implementations, container image file optimization manager 161 may function in whole or in part on server device 140. In such instances, container image file optimization manager 161 can function as a web-based or cloud-based application that is accessible to the user via a web browser or thin-client user interface that executes on client device 160. In some implementations, a portion of container image file optimization manager 161 may execute on client device 160 and another portion of container image file optimization manager 161 may execute on server device 140. While aspects of the present disclosure describe Container image file optimization manager 161 as implemented in a PaaS environment, it should be noted that in other implementations, Container image file optimization manager 161 can also be implemented in an Infrastructure-as-a-Service (IaaS) environment associated with a containerized computing services platform, such as Red Hat® OpenStack®.

The container image file optimization manager 161 can manage optimization of a container image file that can be executed to build a container image. More specifically, as will be described in further detail below with reference to FIGS. 2-5, optimization of the container image file can be performed based on frequency of change of the lines of the container image file between a number of container image builds. If the container image file optimization manager 161 determines, based on the frequency of changes of the lines of the container image file, that the execution order of the lines of the container image file should be optimized, the container image file optimization manager 161 can initiate a process to optimize the execution order of the lines of the container image file for a subsequent container image build. In some embodiments, determining that the execution order of the lines of the container image file should be optimized includes determining that the lines are not arranged in ascending order of frequency of change within the execution order. The execution order can then be modified to obtain a modified execution order by reordering the execution order of the lines such that they are arranged is ascending order of frequency of change (e.g., by swapping the positions of at least one pair of lines of the container image file to achieve the modified execution order).

Since the proposed modification to the container image file can potentially interfere with the execution logic of the container image file, and thus lead to an unacceptable container image build, the container image file optimization manager 161 can commit the proposed modification to the container image file by employing one or more verification mechanisms to determine whether the proposed modification is valid. The one or more verification mechanisms can include having the container image file optimization manager 161 receive an indication of an acceptability of the proposed modification to the container image file, and determine whether to accept or reject the proposed modification to the container image file based on the indication. For example, the container image file optimization manager 161 can send, to a user device, a proposed modification to a container image file, and receive, from the user device via a user interface, an indication of an acceptability of the proposed modification to the container image file. Additionally, the container image file optimization manager 161 can store an acceptance record or a rejection record of the proposed modification to the container image file. The record can be used by the container image file optimization manager 161 to make a decision regarding whether to implement the proposed modification in the future. Further details regarding the functionality of the container image file optimization manager 161 will now be described in further detail below with respect to FIGS. 2-5.

Figure 2:
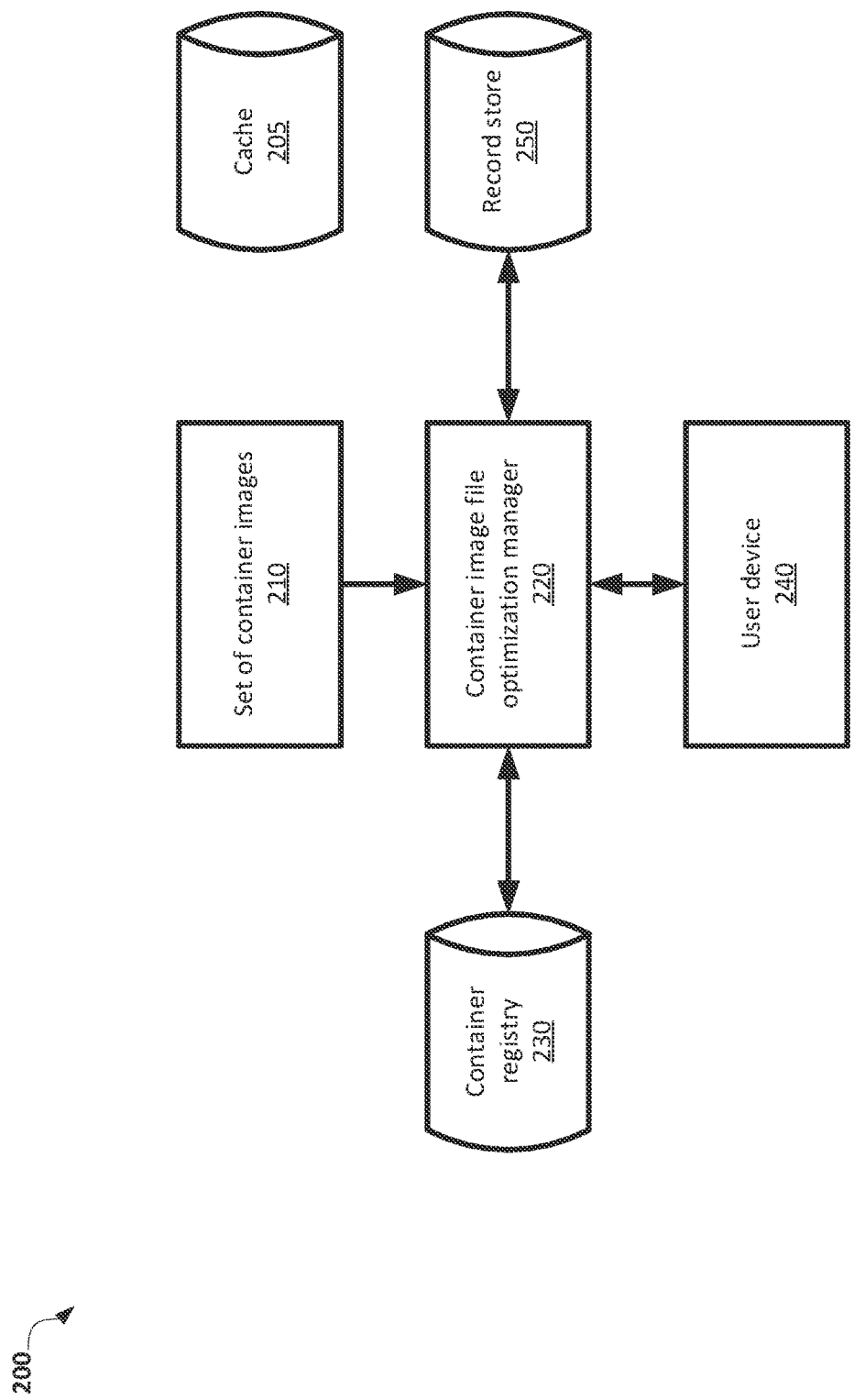
FIG. 2 depicts a block/flow diagram of a system for container image file optimization, in accordance with one or more aspects of the present disclosure.

FIG. 2 depicts a block diagram illustrating a system 200 for managing container image file optimization, in accordance with one or more aspects of the present disclosure. As shown, a set of container images 210 is received by a container image file optimization manager 220. The container image file optimization manager 220 can be similar to or same as the container image file optimization manager 161 of FIG. 1.

To optimize a container image file, the set of container images 210 can be obtained by executing a container image file a certain number of times, where each execution corresponds to a container image build. The container image file can include a number of lines in respective positions. The set of container images 210 can include any suitable number of container image builds in accordance with the embodiments described herein.

The container image file optimization manager 220 can analyze the set of container images 210 to assign a frequency of change to each line. For example, the frequency of change can be a percentage of the time that the line changes among the container images of the set of container images. To achieve the greatest container image build efficiency by increasing reliance on the caching mechanism and reducing the number of repeat line executions of the container image file during container image builds, the execution order of the can optimally be arranged in ascending order of frequency of change in order to reduce the number of line re-executions. More specifically, the top line of the container image file would ideally have a lowest assigned frequency of change among all the lines of the container image file, the next line would have the second lowest assigned frequency of change among all lines of the container image file, such that the bottom line of the container image file would ideally have a highest assigned frequency of change among all the lines of the container image file.

If the execution order is optimally arranged, this means that the execution order of the container image file need not be modified to improve container image build efficiency, and no modification to the container image file is proposed. The container image file can be maintained (e.g., stored) in a container registry 230. The container registry 230 includes one or more repositories for maintaining container images. The container registry 230 essentially acts as a place to store the container image file and share the container image file out via a process of uploading to (e.g., pushing) and downloading from (e.g., pulling). The container registry 230 can maintain other information, including application programming interface (API) paths, access control parameters, etc. Once the container image file is on another system, the application contained within the container image file can be run on that system as well. In some embodiments, the container registry 230 is a public container registry. In some embodiments, the container registry 230 is a private container registry that provides cybersecurity and privacy functionality (e.g., container image authentication, security scanning, patching, access control). Future analysis can be performed on the container image file to see if any modification to the container image file may be warranted.

If the execution order is not optimally arranged, the container image file optimization manager 220 initiates a process to optimize the container image file for building a subsequent container image. Initiating the process to optimize the container image file can include modifying the execution order to obtain at least one modified execution order. For example, the at least one modified execution order can include a number of candidate modified execution orders. The candidate modified execution orders can be arranged in order of potential improvement to container image build efficiency. For example, a most optimal candidate modified execution order can include an arrangement of the lines of the container image file in ascending order based on their respective frequencies of change.

Once the at least one modified execution order is obtained, it can then be determined whether the at least one modified execution order produces a viable container image build by employing a verification mechanism. In some embodiments, the container image file optimization manager 2200 sends (e.g., transmits) the at least one modified execution order to a user device 240 as a set of proposed modifications to the execution order. The container image file optimization manager 220 can then receive, from the user device 240 via a user interface, an indication regarding an acceptability of each proposed modification of the set of proposed modifications. Among the proposed modification(s) determined to be acceptable, the container image file optimization manager 220 can select the proposed modification that has the greatest likelihood of efficient use of the caching mechanism (e.g., the proposed modification that is closest to arranging the lines in ascending order based on their respective frequencies of change), and then accept/confirm the selected proposed modification to the execution order. The container image file optimization manager 220 can, in some embodiments, further generate a modified container image file based on the selected proposed modification, and store the modified container image within the container registry 230.

For each proposed modification determined to be unacceptable, the container image file optimization manager 220 can reject the proposed modification to the execution order. If there are no acceptable modifications with the set of proposed modifications, then no modification is made to the execution order of the lines of the container image file.

The container image file optimization manager 220 can further maintain a record of the determination (e.g., a confirmation record or a rejection record) within a record store 250. The records within the record store 250 can teach the container image file optimization manager 220 which execution order modifications are acceptable and which execution order modifications are unacceptable, so that the container image file optimization manager 220 can determine whether to change the execution order of the container image file without additional user input. Further details regarding the operation of the container image file optimization manager 220 will now be described below with reference to FIGS. 3-6.

Figure 3:
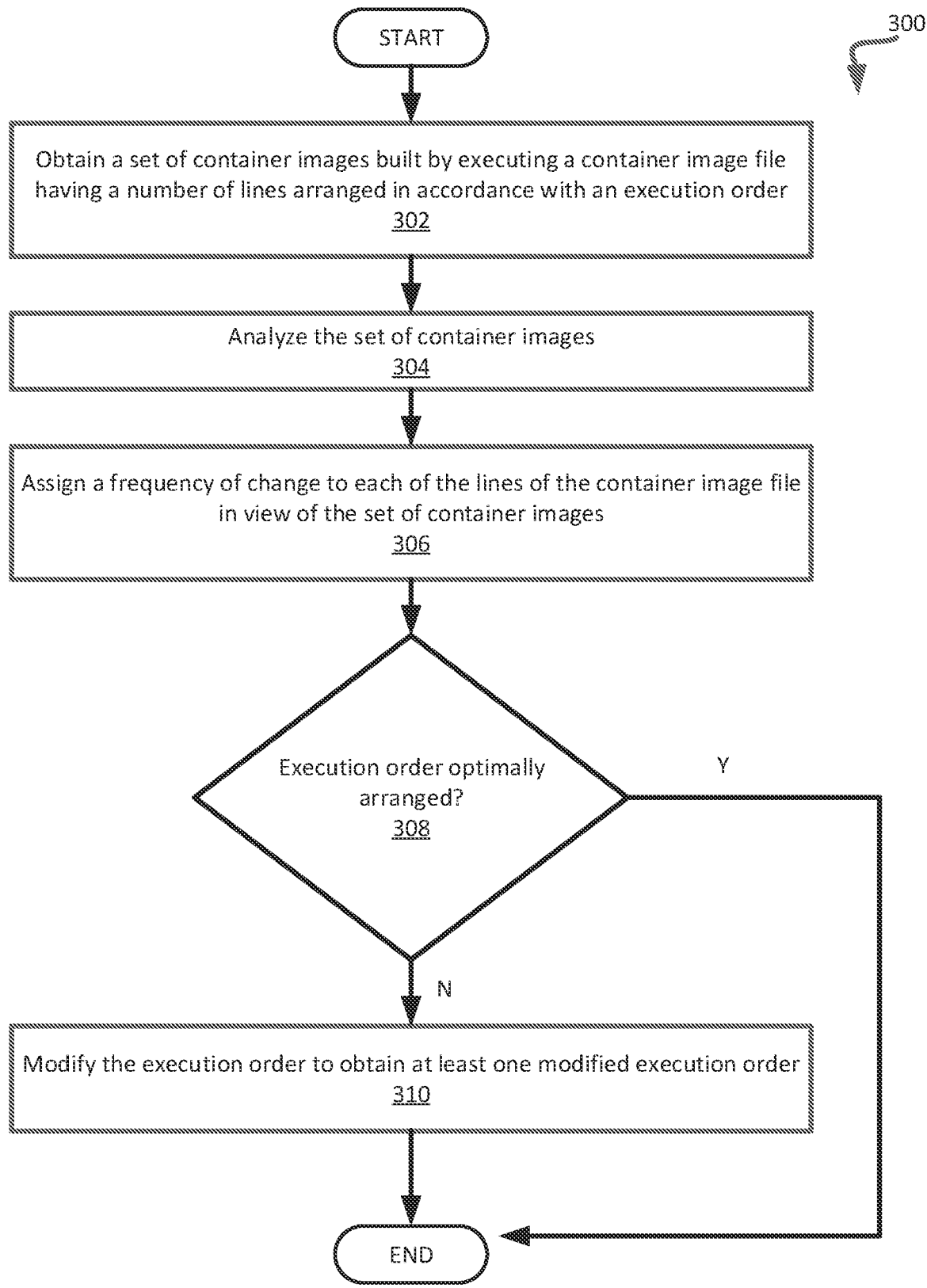
FIG. 3 depicts a flow diagram of a method for optimizing container image file execution, in accordance with one or more aspects of the present disclosure.

FIG. 3 depicts a flow diagram of an example method 300 for container image file optimization, in accordance with one or more aspects of the present disclosure, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, method 300 may be performed by a CI/CD manager, such as the container image file optimization manager 161/220 in FIG. 1 and FIG. 2. Alternatively, some or all of method 300 might be performed by another module or machine. It should be noted that blocks depicted in FIG. 3 could be performed simultaneously or in a different order than that depicted.

At block 302, the processing logic obtains a set of container images built by executing a container image file having a number of lines arranged in accordance with an execution order. The set of container images can include a number of container images that have been built using the container image file in accordance with at least one threshold condition. The at least one threshold condition is chosen to ensure that the set of container images has a sufficient number of container images for analysis at block 304. The at least one threshold condition can be initially set as a default condition, which can be modifiable by a user.

For example, the at least one threshold condition can include a designated time period, and obtaining the set of container images includes obtaining a number of container images built using the container image file over the designated time period. The default designated time period can be chosen to be a day, a week, a month, a year, etc. The designated time period can be selected based on how frequently the container image file is executed to build container images.

As another example, the at least one threshold condition can include a designated number of container images, and obtaining the set of container images can include obtaining the designated number of container images. The designated number of container images can be chosen to provide a suitable large sample size for the analysis performed at block 304. Further details regarding the set of container images and the container image file are described above with reference to FIGS. 1 and 2.

At block 304, the processing logic analyzes the set of container images and at block 306, the processing logic assigns, in view of the set of container images, a frequency of change to each of the lines of the container image file. More specifically, for each line of the container image file, it is determined whether there was a change between consecutive container image executions. This can be done, for example, by arranging the container images within the set of container images in accordance with time of build (e.g., using timestamp metadata), and then comparing the execution of a first container image with the execution of a second container image built right after the first container image. The frequency of change for a line can correspond to a number of repeat executions of the line as observed among the set of container images, as each change forces the container image file to re-execute the line to obtain corresponding data instead of accessing the data from cache. Further details regarding block 304 are described above with reference to FIGS. 1 and 2.

At block 308, the processing logic determines whether the execution order is optimally arranged based on the frequencies of change. In some embodiments, determining whether the execution order is optimally arranged includes determining whether execution of the lines is arranged in ascending order based on the frequencies of change. For example, the processing logic can determine whether there exists a first frequency of change assigned to a first line that is less than a second frequency of change assigned to a second line, where the first line is executed prior to the second line in the execution order. If not, this means that the execution order of the container image file is optimized, and the process ends. Further details regarding block 306 are described above with reference to FIGS. 1 and 2.

Otherwise, the processing logic can initiate a process to optimize the execution order of the lines of the container image file. The optimization of the execution order can improve build efficiency during a build of a subsequent container image based on the container image file.

At block 310, the processing logic modifies the execution order to obtain at least one modified execution order. Modifying the execution order can include reordering execution of at least a subset of the plurality of lines in view of their respective frequencies of change. For example, the at least one modified execution order can include a number of candidate modified execution orders, which can be arranged in order based on predicted efficiency in view of their respective frequencies of change. The at least one modified execution order can include a modified execution order in which the lines are arranged in ascending order based on their respective frequencies of change, which if valid, would be the most optimal execution order for building a container image using the container image file. Modifying the execution order can further include obtaining at least one modified container image file having lines arranged in accordance with the modified execution order.

The process to optimize the container image file can further include one or more verification processes to determine if any of the modified execution orders obtained at block 310 are valid for use in future container image builds. Further details regarding initiating the process to optimize the container image file and performing the process to optimize the container image file are described above with reference to FIGS. 1 and 2, and will now be described in further detail below with reference to FIGS. 4 and 5.

Figure 4:
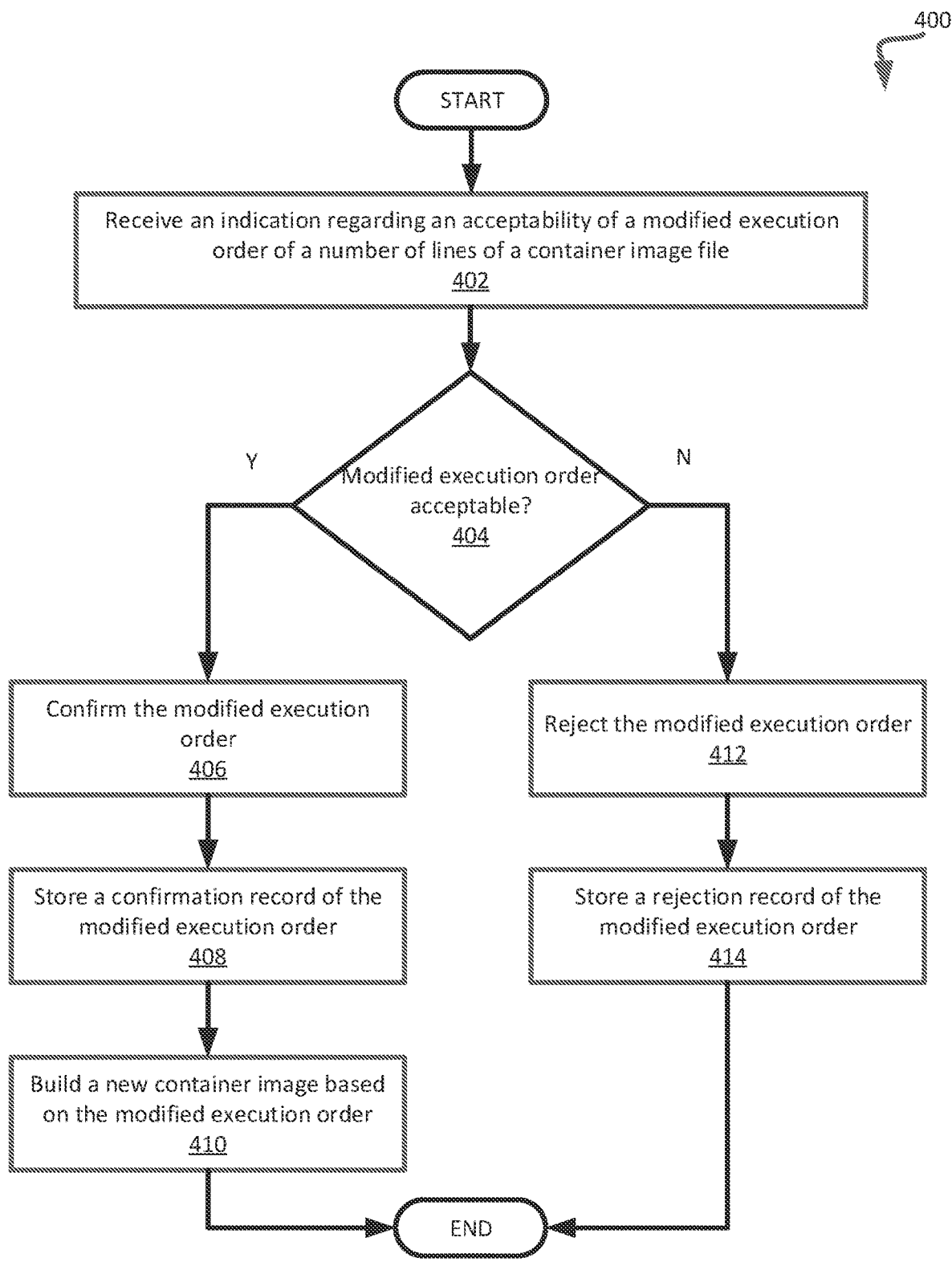
FIG. 4 depicts a flow diagram of a method for validating a modified execution order, in accordance with one or more aspects of the present disclosure.

FIG. 4 depicts a flow diagram of an example method 400 for validating a modified execution order, in accordance with one or more aspects of the present disclosure, in accordance with one or more aspects of the present disclosure. The method 400 may be performed by processing logic that may comprise hardware (circuitry, dedicated logic, etc.), computer readable instructions (run on a general purpose computer system or a dedicated machine), or a combination of both. In an illustrative example, method 400 may be performed by a CI/CD manager, such as the container image file optimization manager 161/220 in FIG. 1 and FIG. 2. Alternatively, some or all of method 400 might be performed by another module or machine. It should be noted that blocks depicted in FIG. 4 could be performed simultaneously or in a different order than that depicted.

At block 402, the processing logic receives an indication regarding an acceptability of a modified execution order of a number of lines of a container image file. The modified execution order can be the same as the modified execution order obtained in the manner described above with reference to FIG. 3.

At block 404, the processing logic determines whether the modified execution order is acceptable in view of the indication. The acceptability of the modified execution order is in reference to whether the modified execution order is valid and can build a substantially similar container image as compared to the previous execution order.

If the modified execution order is acceptable, then the processing logic at block 406 confirms the modified execution order. In some embodiments, the processing logic can, at block 408, store a confirmation record of the modified execution order. Once confirmed, the processing logic at block 410 can build a new container image based on the modified execution order. For example, the modified execution order can be selected as an acceptable modified execution order having the most optimal arrangement of lines among all acceptable modified execution orders in view of their respective frequencies of change (e.g., an acceptable modified execution order that has an arrangement of lines closest to an ascending order of lines based on their respective frequencies of change). The processing logic can execute a modified container image file including the lines arranged in accordance with the selected modified execution order to build the new container image. Since the modified execution order reduces the likelihood of changes to lines of the container image file that result in line execution, the modified execution order can enable increased use of the caching mechanism to improve build speed and performance. Accordingly, the efficiency of building the new container image using the modified container image file can be greater than the efficiency of building previous container images using the previous container image file.

If the modified execution order is unacceptable, the processing logic at block 412 rejects the modified execution order. In addition, at block 414, the processing logic can store a rejection record of the modified execution order. The processing logic can use the rejection record to determine whether a same or similar modified execution order identified in the future should be automatically rejected without analysis. In some embodiments, the rejection record can be included in a training data set for training a machine learning model that learns to determine whether a particular arrangement of lines within an execution order is acceptable. Further details regarding blocks 402-414 are described above with reference to FIGS. 1-3.

Figure 5:
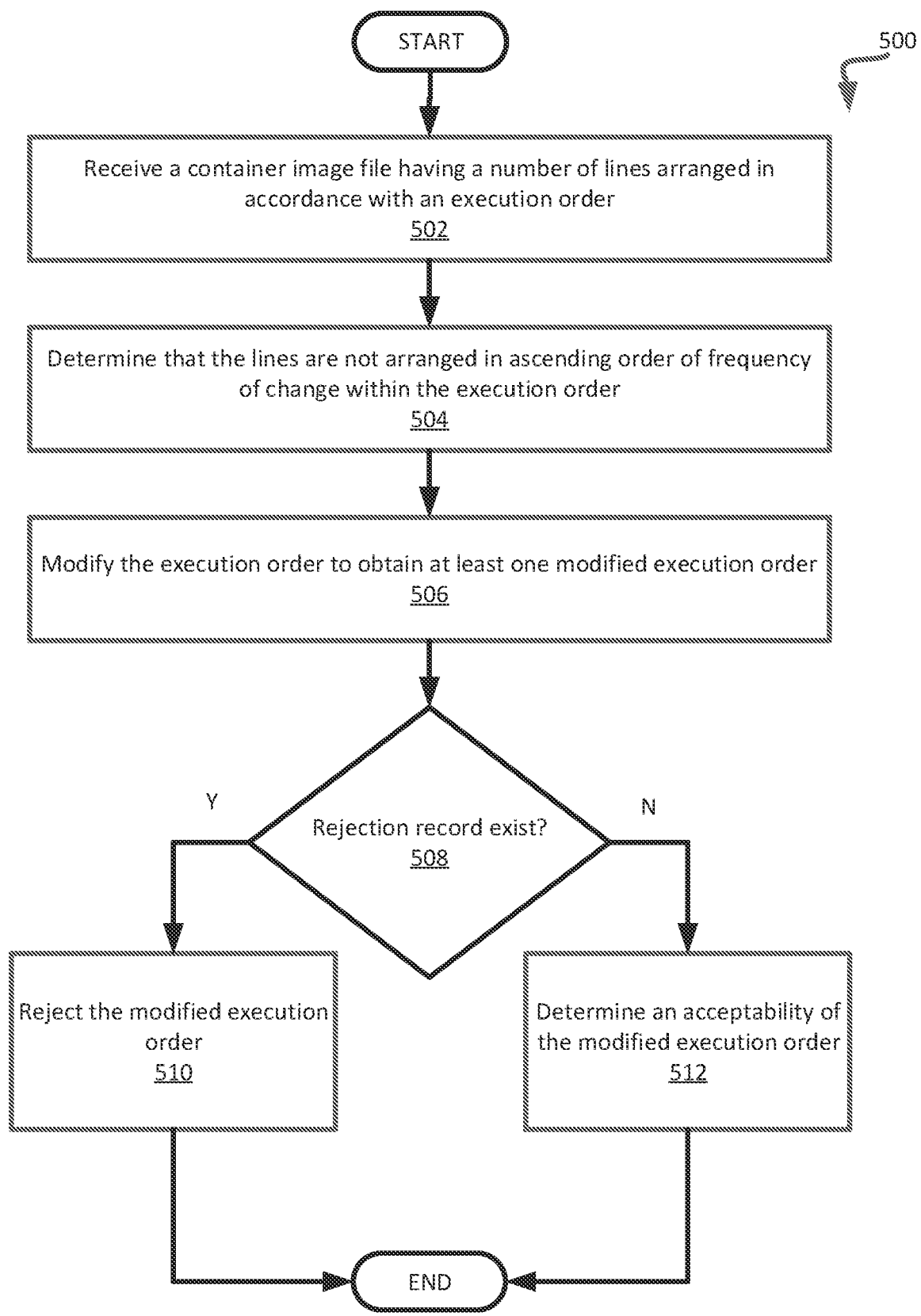
FIG. 5 depicts a flow diagram of a method for optimizing container image file execution, in accordance with one or more aspects of the present disclosure.

FIG. 5 depicts a flow diagram of an example method 500 for performing a process to optimize a container image file, in accordance with one or more aspects of the present disclosure, in accordance with one or more aspects of the present disclosure. The method 500 may be performed by processing logic that may comprise hardware (circuitry, dedicated logic, etc.), computer readable instructions (run on a general purpose computer system or a dedicated machine), or a combination of both. In an illustrative example, method 500 may be performed by a CI/CD manager, such as the container image file optimization manager 161/220 in FIG. 1 and FIG. 2. Alternatively, some or all of method 500 might be performed by another module or machine. It should be noted that blocks depicted in FIG. 5 could be performed simultaneously or in a different order than that depicted.

At block 502, the processing logic receives a container image file having a number of lines arranged in accordance with an execution order. At block 504, the processing logic determines that the lines are not arrange in ascending order of frequency of change within the execution order. At block 506, the processing logic modifies the execution order to obtain at least one modified execution order. At block 508, the processing logic determines whether a rejection record corresponding to the modified execution order exists. If so, the processing logic at block 510 rejects the modified execution order. If a rejection record does not exist, this is not dispositive of the acceptability of the modified execution order, since it could be a newly generated execution order. Thus, the processing logic proceeds to block 512 to determine an acceptability of the modified execution order. Further details regarding blocks 502-512 are described above with reference to FIGS. 1-4.

Figure 6:
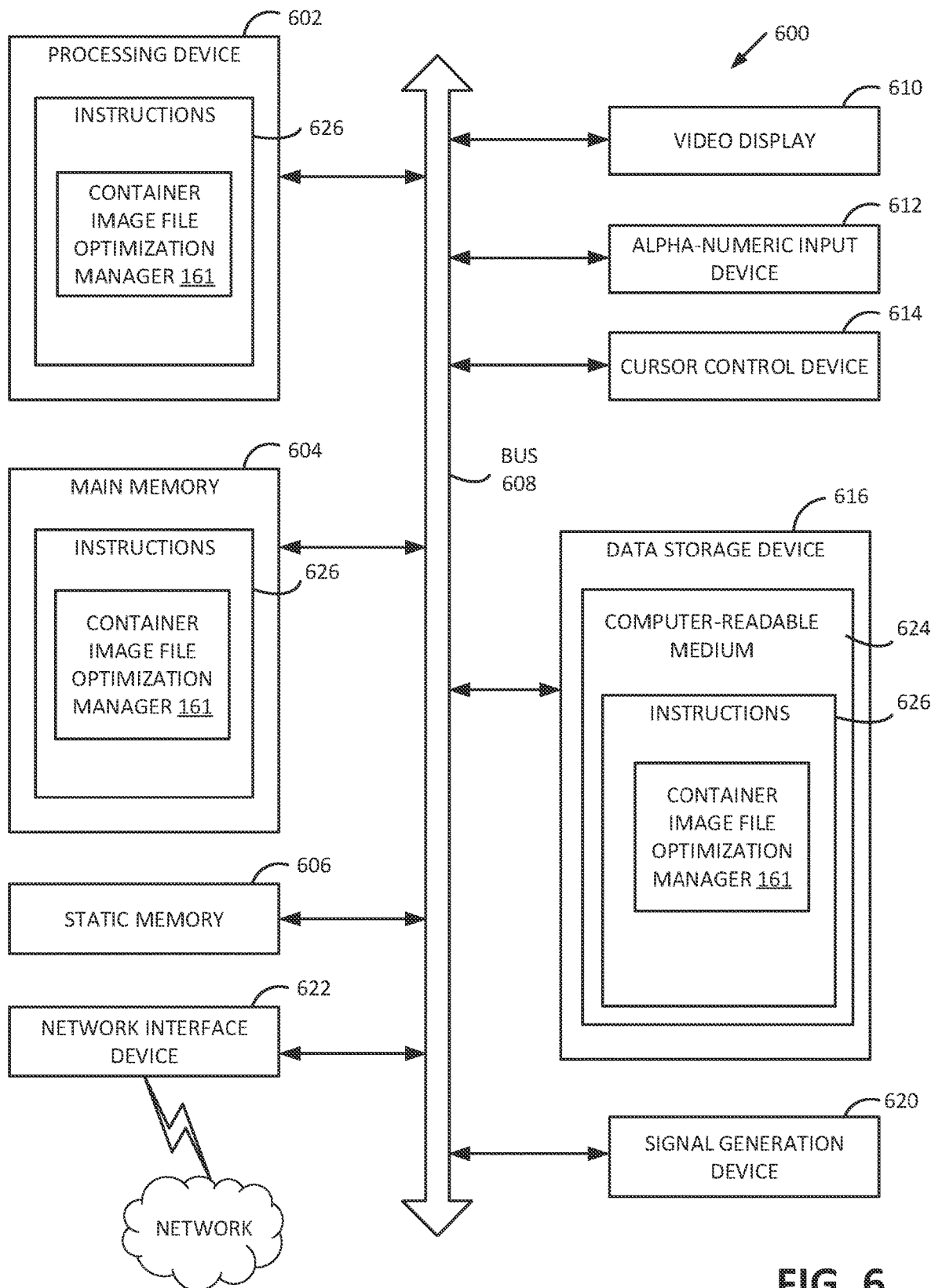
FIG. 6 depicts a block diagram of an illustrative computer system operating in accordance with one or more aspects of the present disclosure.

FIG. 6 depicts an example computer system 600 which can perform any one or more of the methods described herein. In one example, computer system 600 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic (e.g., instructions 626) that includes the container image file optimization manager 161 for performing the operations and steps discussed herein (e.g., corresponding to the method of FIGS. 3-5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a non-transitory computer-readable medium 624 on which may store instructions 626 that include the container image file optimization manager 161 (e.g., corresponding to the method of FIGS. 3-5, etc.) embodying any one or more of the methodologies or functions described herein. Container image file optimization manager 161 may also reside, completely or at least partially, within the main memory 604 and/or within the processing device 602 during execution thereof by the computer system 600, the main memory 604 and the processing device 602 also constituting computer-readable media. Container image file optimization manager 161 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. Other computer system designs and configurations may also be suitable to implement the systems and methods described herein.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "providing," "selecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
   analyzing, by a processing device, a set of container images built in view of a threshold condition selected to provide a sufficient number of container images for the analysis, wherein each container image of the set of container images is built by executing a container image file having a plurality of lines arranged in accordance with an execution order;
   assigning, by the processing device, a frequency of change to each line of the plurality of lines in view of the analysis of the set of container images built in view of the threshold condition;
   modifying, by the processing device, the execution order to obtain a set of modified execution orders by reordering execution of at least a subset of the plurality of lines in view of their respective frequencies of change; and
   building, by the processing device, a new container image by executing the container image file in accordance with a modified execution order in the set of modified execution orders.

2. The method of claim 1, wherein modifying the execution order further comprises arranging execution of the plurality of lines in ascending order of frequency of change.

3. The method of claim 1, further comprising:
   receiving, by the processing device, an indication of acceptability of the modified execution order in the set of modified execution orders, wherein building the new container image is based on the indication of acceptability.

4. The method of claim 3, wherein the modified execution order has a most optimal arrangement of the plurality of lines among a set of acceptable execution orders in view of their respective frequencies of change.

5. The method of claim 1, further comprising:
   receiving, by the processing device, an indication of unacceptability of a second modified execution order of the set of modified execution orders;
   rejecting, by the processing device, the second modified execution order; and
   storing, by the processing device, a rejection record of the second modified execution order.

6. The method of claim 5, further comprising:
   after storing the rejection record, receiving, by the processing device, a second container image file having the plurality of lines arranged in accordance with the execution order; and
   rejecting, by the processing device in view of the rejection record, modification of to the execution order with respect to the second container image file.

7. The method of claim 1, further comprising:
   obtaining, by the processing device, the set of container images.

8. A computing system comprising:
   a memory; and
   a processing device, operatively coupled to the memory, to:
     analyze a set of container images built in view of a threshold condition selected to provide a sufficient number of container images for the analysis, wherein each container image of the set of container images is built by executing a container image file having a plurality of lines arranged in accordance with an execution order;
     assign a frequency of change to each line of the plurality of lines of the container image file in view of the analysis of the set of container images built in view of the threshold condition;
     modify the execution order to obtain a set of modified execution orders by reordering execution of at least a subset of the plurality of lines in view of their respective frequencies of change; and
     build a new container image by executing the container image file in accordance with a modified execution order in the set of modified execution orders.

9. The computing system of claim 8, wherein to modify the execution order, the processing device is to arrange execution of the plurality of lines in ascending order of frequency of change.

10. The computing system of claim 8, wherein the processing device is further to:
    receive an indication of acceptability of the modified execution order, wherein to build the new container image, the processing device is to build the new container image based on the indication of acceptability.

11. The computing system of claim 10, wherein the modified execution order has a most optimal arrangement of the plurality of lines among a set of acceptable execution orders in view of their respective frequencies of change.

12. The computing system of claim 8, wherein the processing device is further to:
    receive an indication of unacceptability of a second modified execution order of the set of modified execution orders;
    reject the second modified execution order; and
    store a rejection record of the second modified execution order.

13. The computing system of claim 12, wherein the processing device is further to:
  after the storage of the rejection record, receive a second container image file having the plurality of lines arranged in accordance with the execution order; and
  reject, in view of the rejection record, modification of to the execution order with respect to the second container image file.

14. The computing system of claim 8, wherein the processing device is further to:
  obtain the set of container images.

15. A computing system comprising:
  a memory; and
  a processing device, operatively coupled to the memory, to:
    receive a container image file having a plurality of lines arranged in accordance with an execution order, wherein the container image is associated with a plurality of container images built in view of a threshold condition selected to provide a sufficient number of container images for an analysis of the plurality of container images;
    determine, in view of the execution order, that the plurality of lines is not arranged for execution in ascending order of frequency of change;
    in response to the determination that the plurality of lines is not arranged in ascending order of frequency of change, modify the execution order to obtain a set of modified execution orders by reordering execution of at least a subset of the plurality of lines in view of their respective frequencies of change; and
    build a new container image by executing the container image file in accordance with a modified execution order in the set of modified execution orders.

16. The computing system of claim 15, wherein to determine that the plurality of lines is not arranged for execution in ascending order of frequency of change, the processing device is to:
  analyze the plurality of container images built by executing the container image file; and
  assign a frequency of change to each line of the plurality of lines in view of the plurality of container images.

17. The computing system of claim 15, wherein the processing device is further to:
  determine whether a rejection record corresponding to a second modified execution order exists; and
  in response to determining that the rejection record exists, reject the second modified execution order.

18. The computing system of claim 17, wherein prior to the reception of the container image file, the processing device is further to:
  analyze a set of container images, wherein each container image of the set of container images is built by executing a second container image file having a second plurality of lines arranged in accordance with the execution order;
  assign a frequency of change to each line of the second plurality of lines in view of the set of container images; and
  modify the execution order to obtain a second set of modified execution orders including the modified execution order by reordering execution of at least a second subset of the second plurality of lines in view of their respective frequencies of change.

19. The computing system of claim 18, wherein the processing device is further to:
  obtain the set of container images.

20. The computing system of claim 18, wherein the processing device is further to:
  receive an indication of unacceptability of a second modified execution order;
  determine that the second modified execution order is unacceptable in view of the indication;
  reject the second modified execution order; and
  store the rejection record of the second modified execution order.

* * * * *